(12) United States Patent
Post et al.

(10) Patent No.: US 8,756,458 B2
(45) Date of Patent: Jun. 17, 2014

(54) MOUNT-TIME RECONCILIATION OF DATA AVAILABILITY

(75) Inventors: Daniel J. Post, Cupertino, CA (US); Nir Jacob Wakrat, Los Altos, CA (US); Vadim Khmelnitsky, Foster City, CA (US)

(73) Assignee: Apple Inc., Cupertino, CA (US)

( * ) Notice: Subject to any disclaimer, the term of this patent is extended or adjusted under 35 U.S.C. 154(b) by 194 days.

(21) Appl. No.: 13/323,347

(22) Filed: Dec. 12, 2011

(65) Prior Publication Data

US 2013/0151830 A1     Jun. 13, 2013

(51) Int. Cl.
*G06F 11/00* (2006.01)

(52) U.S. Cl.
USPC .......................................................... 714/36

(58) Field of Classification Search
USPC ........ 714/6.1, 6.11, 6.12, 15, 36, 42, 54, 773; 713/1, 2; 707/822–824
See application file for complete search history.

(56) References Cited

U.S. PATENT DOCUMENTS

| | | | |
|---|---|---|---|
| 6,931,440 B1* | 8/2005 | Blumenau et al. | 709/220 |
| 7,093,161 B1* | 8/2006 | Mambakkam et al. | 714/15 |
| 7,356,662 B2 | 4/2008 | Shoff et al. | |
| 7,454,653 B2 | 11/2008 | Nicholson et al. | |
| 7,493,424 B1 | 2/2009 | Bali et al. | |
| 7,818,610 B2* | 10/2010 | Rogers et al. | 714/6.12 |
| 7,975,171 B2 | 7/2011 | Haustein et al. | |
| 8,130,554 B1 | 3/2012 | Linnell | |
| 2003/0088812 A1 | 5/2003 | Lasser | |
| 2003/0135729 A1* | 7/2003 | Mason et al. | 713/2 |
| 2004/0255106 A1* | 12/2004 | Rothman et al. | 713/1 |
| 2006/0015676 A1 | 1/2006 | Oribe et al. | |
| 2007/0073962 A1 | 3/2007 | Nakamura et al. | |

(Continued)

FOREIGN PATENT DOCUMENTS

| | | |
|---|---|---|
| JP | H06-044144 | 2/1994 |
| JP | H06-214892 | 8/1994 |

(Continued)

OTHER PUBLICATIONS

Dinwiddy. "Developing a Filesystem Optimised for Solid State Hard Drives." May 7, 2010, pp. 44-51, http://www.cs.bath.ac.uk/~mdv/courses/CM30082/projects.bho/2009-10/Dinwiddy-JJ-dissertation-2009-10.pdf.

(Continued)

*Primary Examiner* — Scott Baderman
*Assistant Examiner* — Joseph Kudirka
(74) *Attorney, Agent, or Firm* — Van Court & Aldridge LLP

(57) ABSTRACT

Systems and methods are disclosed for mount-time reconciliation of data availability. During system boot-up, a non-volatile memory ("NVM") driver can be enumerated, and an NVM driver mapping can be obtained. The NVM driver mapping can include the actual availability of LBAs in the NVM. A file system can then be mounted, and a file system allocation state can be generated. The file system allocation state can indicate the file system's view of the availability of LBAs. Subsequently, data availability reconciliation can be performed. That is, the file system allocation state and the NVM driver mapping can be overlaid and compared with one another in order to expose any discrepancies.

20 Claims, 8 Drawing Sheets

(56) References Cited

U.S. PATENT DOCUMENTS

| | | |
|---|---|---|
| 2008/0195799 A1 | 8/2008 | Park |
| 2008/0229428 A1 | 9/2008 | Camiel |
| 2008/0307192 A1 | 12/2008 | Sinclair et al. |
| 2009/0043959 A1 | 2/2009 | Yamamoto |
| 2009/0089610 A1 | 4/2009 | Rogers et al. |
| 2009/0222688 A1 | 9/2009 | Kurashige |
| 2010/0169556 A1 | 7/2010 | Nakanishi et al. |
| 2011/0055454 A1 | 3/2011 | Byom et al. |
| 2011/0078363 A1 | 3/2011 | Yeh et al. |
| 2011/0099324 A1 | 4/2011 | Yeh |
| 2011/0106804 A1* | 5/2011 | Keeler et al. .......... 707/737 |
| 2011/0113194 A1 | 5/2011 | Terry et al. |
| 2011/0125954 A1 | 5/2011 | Yeh et al. |
| 2011/0238886 A1 | 9/2011 | Post et al. |
| 2011/0239088 A1 | 9/2011 | Post |
| 2012/0054541 A1 | 3/2012 | Byom et al. |
| 2012/0311298 A1 | 12/2012 | Post et al. |
| 2013/0151830 A1 | 6/2013 | Post et al. |

FOREIGN PATENT DOCUMENTS

| | | |
|---|---|---|
| JP | 2005-528696 | 9/2005 |
| JP | 2008-191701 | 8/2008 |
| KR | 10-0895429 | 5/2009 |
| WO | 2009/118917 | 10/2009 |
| WO | 2010/111694 | 9/2010 |
| WO | 2011/035245 | 3/2011 |

OTHER PUBLICATIONS

Edwards, "White Paper: The TRIM Command." Dec. 2, 2009, http://www.maximumpc.com/article/features/white_paper_trim_command, 4 pages.

Intel Solid-State Drive Optimizer, copyright 2009, http://download.intel.com/design/flash/nand/mainstream/Intel_SSD_Optimizer_White_Paper.pdf, 8 pages.

Microsoft, "Defragging SSDs a Default?" Mar. 2, 2012, p. 2, http://social.technet.microsoft.com/Forums/en-US/w8itprogeneral/thread/f97425f8-3857-4aa4-9cf5-437d5e212c9c/, 17 pages.

Williams, "Enabling and Testing SSD TRIM Support Under Linux." May 6, 2011, http://techgage.com/article/enabling_and_testing_ssd_trim_support_under_linux/1/, 5 pages.

SDB:SSD discard (trim) support, openSUSE Support Database, Sep. 13, 2010, http://web.archive.org/web/20100913125059/http://en.opensuse.org/SDB:SSD_discard_(trim)_support, 3 pages.

"Query Results for mkfs.ext4: in the all Man Page Set—Section 8." The Unix and Linux Forums, Dec. 2010, http://www.unix.com/man-page/All/8/mkfs.ext4/, 7 pages.

Using Context Clues to Aid Reading, eWriting, retrieved from http://flang1.kendall.mdc.edu/cpt/R04/3_R04lecture1/R04lecture1.htm on Dec. 11, 2013 (5 pages).

Definition mount, Margaret Rouse, Sep. 2005, retrieved from http://whatis.techtarget.com/definition/mount on Dec. 16, 2013 (1 page).

What's Important for Information Security: A Manager's Guide, M. E. Kabay, retrieved from http://www.mekabay.com/infosecmgmt/mgrguidesec.pdf on Dec. 16, 2013 (4 pages).

* cited by examiner

MOUNT-TIME RECONCILIATION OF DATA AVAILABILITY

BACKGROUND OF THE DISCLOSURE

NAND flash memory, as well as other types of non-volatile memories ("NVMs"), are commonly used for mass storage. For example, consumer electronics such as portable media players often include flash memory to store music, videos, and other media.

A system can store different types of files in an NVM. When the system experiences an error, discrepancies can occur between a file system's view of the files stored in the NVM and the actual files that are stored in the NVM. Eventually, when the file system needs to access a particular file, the system may discover that the file is either corrupt or does not exist in the NVM. This then triggers the file system to attempt to recover the file from an external source. The discovery of discrepancies and subsequent recovery during system operation can be disruptive to the user experience.

SUMMARY OF THE DISCLOSURE

Systems and methods are disclosed for mount-time reconciliation of data availability. During system boot-up, a non-volatile memory ("NVM") driver can be enumerated, and an NVM driver mapping can be obtained. The NVM driver mapping can include the actual availability of LBAs in the NVM. A file system can then be mounted, and a file system allocation state can be generated. The file system allocation state can indicate the file system's view of the availability of LBAs. Subsequently, data availability reconciliation can be performed. That is, the file system allocation state and the NVM driver mapping can be overlaid and compared with one another in order to expose any discrepancies.

BRIEF DESCRIPTION OF THE DRAWINGS

The above and other aspects and advantages of the invention will become more apparent upon consideration of the following detailed description, taken in conjunction with accompanying drawings, in which like reference characters refer to like parts throughout, and in which.

DETAILED DESCRIPTION OF THE DISCLOSURE

Systems and methods for mount-time reconciliation of data availability are provided. During system boot-up, a non-volatile memory ("NVM") driver can be enumerated, and an NVM driver mapping can be obtained. The NVM driver mapping can include the actual availability of LBAs in the NVM.

A file system can then be mounted. During the mounting process, a file system allocation state can be generated, which can indicate the file system's view of the availability of LBAs. Subsequently, data availability reconciliation can be performed. That is, the file system allocation state and the NVM driver mapping can be overlaid and compared with one another in order to expose any discrepancies.

In particular, for each available LBA range in the file system allocation state, the file system can transmit a command to an NVM interface of the system. Upon receiving the command, the NVM interface can determine whether the NVM driver mapping has a consistent state.

If the NVM interface determines that the NVM driver mapping is inconsistent (e.g., at least one portion of the LBA range is unavailable), the NVM interface can transmit information to the file system indicating this inconsistency. As used herein, a LBA range is "unavailable" if the LBA range is known-uncorrectable or unmapped. Upon receiving this information, the file system can invoke a policy to restore data associated with the at least one portion of the LBA range.

Figure 1:
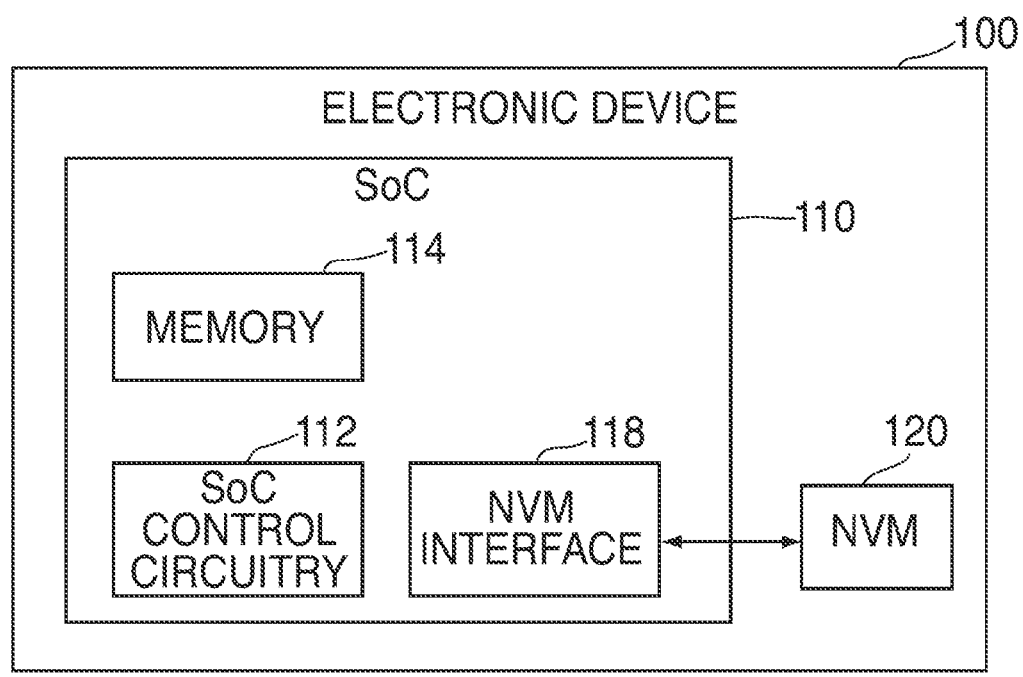
FIGS. 1 and 2 are block diagrams of electronic devices configured in accordance with various embodiments of the invention.

FIG. 1 illustrates a block diagram of electronic device 100. In some embodiments, electronic device 100 can be or can include a portable media player, a cellular telephone, a pocket-sized personal computer, a personal digital assistance ("PDA"), a desktop computer, a laptop computer, and any other suitable type of electronic device.

Electronic device 100 can include system-on-a-chip ("SoC") 110 and non-volatile memory ("NVM") 120. Non-volatile memory 120 can include a NAND flash memory based on floating gate or charge trapping technology, NOR flash memory, erasable programmable read only memory ("EPROM"), electrically erasable programmable read only memory ("EEPROM"), Ferroelectric RAM ("FRAM"), magnetoresistive RAM ("MRAM"), or any combination thereof.

NVM 120 can be organized into "blocks", which can be the smallest erasable unit, and further organized into "pages", which can be the smallest unit that can be programmed or read. In some embodiments, NVM 120 can include multiple integrated circuits, where each integrated circuit may have multiple blocks. Memory locations (e.g., blocks or pages of blocks) from corresponding integrated circuits may form "super blocks". Each memory location (e.g., page or block) of NVM 120 can be referenced using a physical address (e.g., a physical page address or physical block address).

In some embodiments, one or more designated blocks of NVM 120 can store context information. As used herein, "context information" can refer to information associated with the state of the entire NVM at a particular point in time. For example, context information can include logical-to-physical mappings for the blocks of NVM 120 at a particular time. As used herein, "logical-to-physical mappings" can be mappings between one or more logical addresses (e.g., logical sectors) and physical page addresses of data pages.

In some embodiments, one or more blocks of NVM 120 can include block table-of-contents ("TOCs"). Each block TOC can include information that maps pages of the block to corresponding logical addresses. In some embodiments, the block TOC may include only the logical address (e.g., the logical block address ("LBA") or the logical page number) for each page that is programmed in the block. In other embodiments, the block TOC may also include the relative age of updates made to a page (e.g., when a page has been updated relative to other pages). In such embodiments, the block TOC can include a logical address-age pair for each page that is programmed.

System-on-a-chip 110 can include SoC control circuitry 112, memory 114, and NVM interface 118. SoC control circuitry 112 can control the general operations and functions of SoC 110 and the other components of SoC 110 or device 100. For example, responsive to user inputs and/or the instructions of an application or operating system, SoC control circuitry 112 can issue read or write commands to NVM interface 118 to obtain data from or store data in NVM 120. For clarity, data that SoC control circuitry 112 may request for storage or retrieval may be referred to as "user data," even though the data may not be directly associated with a user or user application. Rather, the user data can be any suitable sequence of digital information generated or obtained by SoC control circuitry 112 (e.g., via an application or operating system).

SoC control circuitry 112 can include any combination of hardware, software, and firmware, and any components, circuitry, or logic operative to drive the functionality of electronic device 100. For example, SoC control circuitry 112 can include one or more processors that operate under the control of software/firmware stored in NVM 120 or memory 114.

Memory 114 can include any suitable type of volatile memory, such as random access memory ("RAM") (e.g., static RAM ("SRAM"), dynamic random access memory ("DRAM"), synchronous dynamic random access memory ("SDRAM"), double-data-rate ("DDR") RAM), cache memory, read-only memory ("ROM"), or any combination thereof. Memory 114 can include a data source that can temporarily store user data for programming into or reading from non-volatile memory 120. In some embodiments, memory 114 may act as the main memory for any processors implemented as part of SoC control circuitry 112.

Memory 114 can include one or more data structures for storing logical-to-physical mappings. For example, memory 114 can include a tree, which can provide a mapping between LBA ranges and corresponding physical addresses of NVM 120. Trees will be described in more detail in connection with FIGS. 6 and 7.

NVM interface 118 may include any suitable combination of hardware, software, and/or firmware configured to act as an interface or driver between SoC control circuitry 112 and NVM 120. For any software modules included in NVM interface 118, corresponding program code may be stored in NVM 120 or memory 114.

NVM interface 118 can perform a variety of functions that allow SoC control circuitry 112 to access NVM 120 and to manage the memory locations (e.g., pages, blocks, super blocks, integrated circuits) of NVM 120 and the data stored therein (e.g., user data). For example, NVM interface 118 can interpret the read or write requests from SoC control circuitry 112, perform wear leveling, and generate read and program instructions compatible with the bus protocol of NVM 120.

While NVM interface 118 and SoC control circuitry 112 are shown as separate modules, this is intended only to simplify the description of the embodiments of the invention. It should be understood that these modules may share hardware components, software components, or both. For example, SoC control circuitry 112 may execute a software-based memory driver for NVM interface 118.

In some embodiments, electronic device 100 can include a target device, such as a flash memory drive or Secure Digital ("SD") card, that includes NVM 120 and some or all portions of NVM interface 118 (e.g., a translation layer, discussed below). In these embodiments, SoC 110 or SoC control circuitry 112 may act as the host controller for the target device. For example, as the host controller, SoC 110 can issue read and write requests to the target device.

Figure 2:
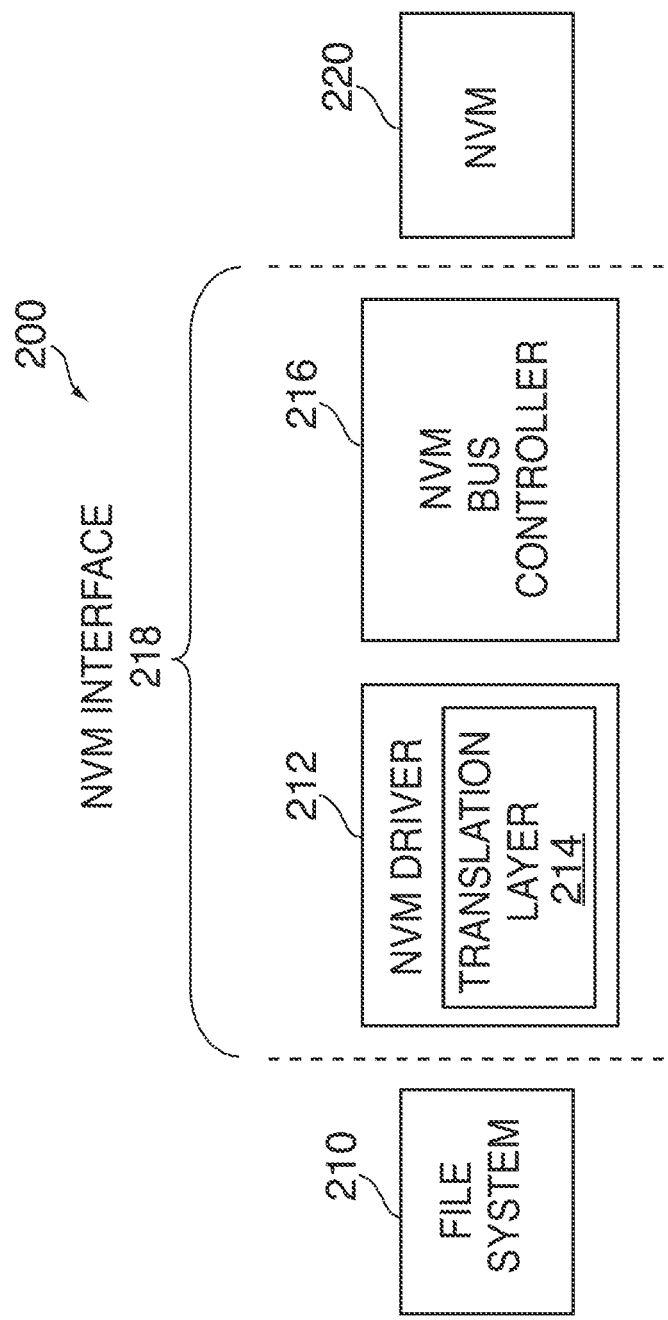

FIG. 2 illustrates a block diagram of electronic device 200, which may illustrate in greater detail some of the firmware, software, and/or hardware components of electronic device 100 (FIG. 1) in accordance with various embodiments. Electronic device 200 may have any of the features and functionalities described above in connection with FIG. 1, and vice versa. As shown, dashed lines demarcate the layers. It is understood that the depiction of which components fall within the demarcation lines are merely illustrative and that one or more components can be affiliated with a different layer.

Electronic device 200 can include file system 210, NVM driver 212, NVM bus controller 216, and NVM 220. In some embodiments, file system 210 and NVM driver 212 may be software or firmware modules, and NVM bus controller 216 and NVM 220 may be hardware modules. Accordingly, in these embodiments, NVM driver 212 may represent the software or firmware aspect of NVM interface 218, and NVM bus controller 216 may represent the hardware aspect of NVM interface 218.

File system 210 can include any suitable type of file system, such as a File Allocation Table ("FAT") file system or a Hierarchical File System Plus ("HFS+"), and may be part of the operating system of electronic device 200 (e.g., part of SoC control circuitry 112 of FIG. 1). In some embodiments, file system 210 may include a flash file system, which provides a logical-to-physical mapping of pages. In these embodiments, file system 210 may perform some or all of the functionalities of NVM driver 212 discussed below, and therefore file system 210 and NVM driver 212 may or may not be separate modules.

File system 210 may manage file and folder structures for the application and operating system. File system 210 may operate under the control of an application or operating system running on electronic device 200, and may provide write and read commands to NVM driver 212 when the application or operating system requests that information be read from or stored in NVM 220. Along with each read or write command, file system 210 can provide a logical address to indicate where the user data should be read from or written to, such as a logical page address or a LBA with a page offset.

File system 210 may provide read and write requests to NVM driver 212 that are not directly compatible with NVM 220. For example, the logical addresses may use conventions or protocols typical of hard-drive-based systems. A hard-drive-based system, unlike flash memory, can overwrite a memory location without first performing a block erase. Moreover, hard drives may not need wear leveling to increase the lifespan of the device. Therefore, NVM interface 218 can perform any functions that are memory-specific, vendor-specific, or both to handle file system requests and perform other management functions in a manner suitable for NVM 220.

NVM driver 212 can include translation layer 214. In some embodiments, translation layer 214 may be or include a flash translation layer ("FTL"). On a write command, translation layer 214 can map the provided logical address to a free, erased physical location on NVM 220. On a read command, translation layer 214 can use the provided logical address to determine the physical address at which the requested data is stored. Because each NVM may have a different layout depending on the size or vendor of the NVM, this mapping operation may be memory and/or vendor-specific. Translation layer 214 can perform any other suitable functions in addition to logical-to-physical address mapping. For example, translation layer 214 can perform any of the other functions that may be typical of flash translation layers, such as garbage collection ("GC") and wear leveling.

For example, translation layer 214 can perform garbage collection to free up a programmed block of NVM 220 for erasing. Once freed and erased, the memory locations can be used to store new user data received from file system 210, for example. In some cases, the GC process may involve copying the valid data from the programmed block to another block having erased memory locations, thereby invalidating the valid data in the programmed block. Once all of the memory locations in the programmed block have been invalidated, translation layer 214 may direct bus controller 216 to perform an erase operation on the programmed block. As used herein, "valid data" may refer to user data that has been programmed in response to the most recent write request corresponding to one or more logical addresses (e.g., LBAs), and may therefore be the valid version of user data for the one or more logical addresses.

NVM driver 212 may interface with NVM bus controller 216 to complete NVM access commands (e.g., program, read, and erase commands). Bus controller 216 may act as the hardware interface to NVM 220, and can communicate with NVM 220 using the bus protocol, data rate, and other specifications of NVM 220.

NVM interface 218 may manage NVM 220 based on memory management data, sometimes referred to herein as "metadata". The metadata may be generated by NVM driver 212 or may be generated by a module operating under the control of NVM driver 212. For example, metadata can include any information used for managing the mapping between logical and physical addresses, bad block management, wear leveling, error-correcting code ("ECC") data used for detecting or correcting data errors, or any combination thereof. The metadata may include data provided by file system 210 along with the user data, such as a logical address. Thus, in general, "metadata" may refer to any information about or relating to user data or used generally to manage the operation and memory locations of a non-volatile memory.

NVM interface 218 may be configured to store metadata in NVM 220. In some embodiments, NVM interface 218 may store metadata associated with user data at the same memory location (e.g., page) in which the user data is stored. For example, NVM interface 218 may store user data, the associated logical address, and ECC data for the user data at one or more memory locations of NVM 220. NVM interface 218 may also store other types of metadata about the user data in the same memory location.

NVM interface 218 may store the logical address so that, on power-up of NVM 220 or during operation of NVM 220, electronic device 200 can determine what data resides at that location. In particular, because file system 210 may reference the user data according to its logical address and not its physical address, NVM interface 218 may store the user data and logical address together to maintain their association. This way, even if an index table in NVM 220 maintaining the physical-to-logical mapping becomes outdated, NVM interface 218 may still determine the proper mapping at power-up or reboot of electronic device 200, for example.

Conventionally, when a system experiences an error during system operation (e.g., an unrecoverable NVM error, a file system error, or a general system error), discrepancies can occur between a file system's view of the files stored in the NVM and the actual files that are stored in the NVM. For example, during an unclean reboot, the file system may have already allocated LBAs for a file (e.g., metadata has been updated to reflect that a file has been downloaded), but the file has not yet been programmed to the NVM.

In such situations, the file system may assume that one or more LBAs are available (e.g., the one or more LBAs are associated with correctable user data stored in the NVM), but the one or more LBAs may actually be unavailable. As used herein, "unavailable LBAs" can refer to LBAs that are unallocated/unmapped (e.g., LBAs that are not associated with user data stored in the NVM) or known-uncorrectable (e.g., the error correction codes of the user data associated with the LBAs are not functioning). At a later time, when the file system needs to access the one or more LBAs, the system may discover that associated user data are missing or corrupt. The file system may then attempt to recover user data associated with the one or more LBAs. This process, however, may negatively impact user experience.

In some embodiments, rather than waiting for a user to intercept discrepancies, the system can initiate a full NVM scan during system operation. By comparing the file system's view of the availability of LBAs with the results of the NVM scan, the system can detect discrepancies. This can be a time-consuming process, and can cause problems while the system is operating because the system needs to be fully responsive to application requests.

Accordingly, in order to avoid these performance issues, the system can initiate a reconciliation process at an earlier time, in particular, during system boot-up. This can allow the reconciliation to be performed with minimal impact on system performance. In particular, because the file system does not yet have to respond to read and write requests from applications during boot-up, the system has sufficient time to perform the reconciliation process. Therefore, a baseline of available LBAs can be established before the system becomes fully operational, and system accesses can be held off until the system reaches a known-good state. In addition, because the reconciliation process deals with only small data structures stored in volatile memory, the reconciliation process can be performed much faster in comparison to a process that conducts a full read pass of the NVM.

Figure 3:
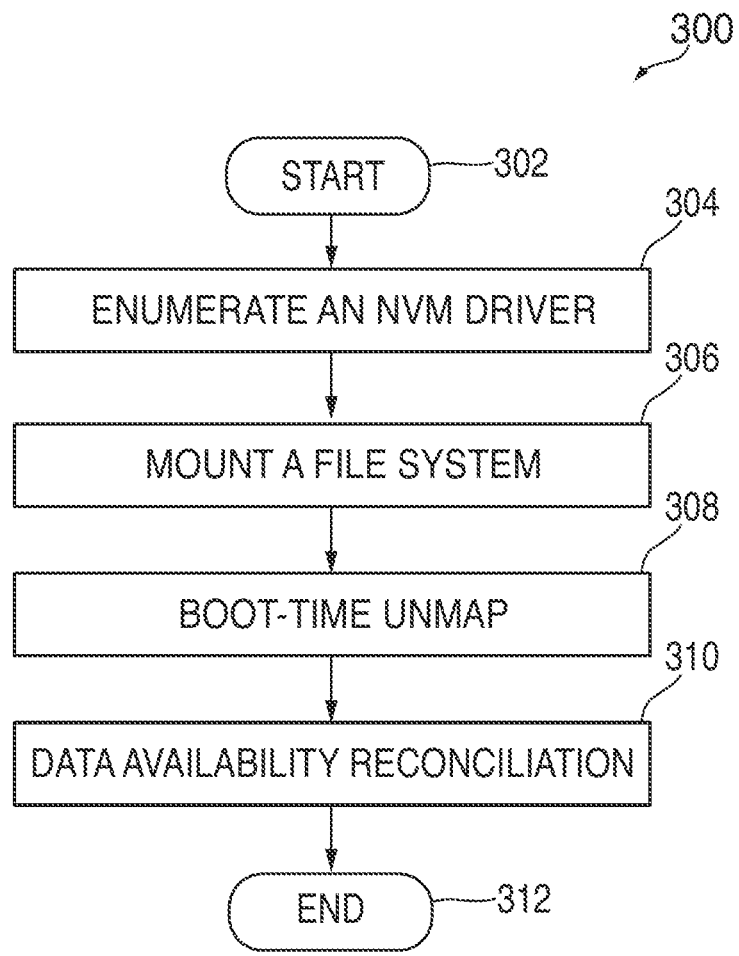
FIG. 3 is a flowchart of an illustrative process for data availability reconciliation during system boot-up in accordance with various embodiments of the invention.

Referring now to FIG. 3, process 300 is shown for data availability reconciliation during system boot-up. Process 300 may begin at step 302, and at step 304, an NVM driver (e.g., NVM driver 212 of FIG. 2) can be enumerated. In particular, an NVM driver mapping, which can be stored in volatile memory (e.g., memory 114 of FIG. 1), can be obtained during the enumeration. The NVM driver mapping can include the actual availability of LBAs in the NVM.

The enumeration of the NVM driver can be performed by scanning an NVM (e.g., NVM 120 of FIG. 1 or NVM 220 of FIG. 2). For example, an NVM interface (e.g., NVM interface 118 of FIG. 1 or NVM interface 218 of FIG. 2) can read context information stored in the NVM, where the context information includes logical-to-physical mappings. The NVM interface can then load the logical-to-physical mappings into volatile memory. In some cases, the NVM interface can identify one or more blocks with logical-to-physical mappings that have not been captured by the context information (e.g., blocks that have been updated more recently). As a result, the NVM interface can scan the block TOCs of the one or more blocks in order to update the logical-to-physical mappings in the volatile memory.

In some embodiments, the updated logical-to-physical mappings can be stored in a suitable data structure such as, for example, a tree or a mapping table. Based on the results of the NVM driver enumeration (e.g., the updated logical-to-physical mappings), the NVM interface can obtain an NVM driver mapping, which can indicate the availability of LBAs in the NVM. Trees and NVM driver mappings will be discussed in more detail in connection with FIGS. 6 and 7.

In other embodiments, the NVM interface can obtain an NVM driver mapping by directly scanning the NVM (e.g., by examining the state of one or more flags stored in the NVM). This process will be discussed in more detail in connection with FIG. 8.

Figure 4:
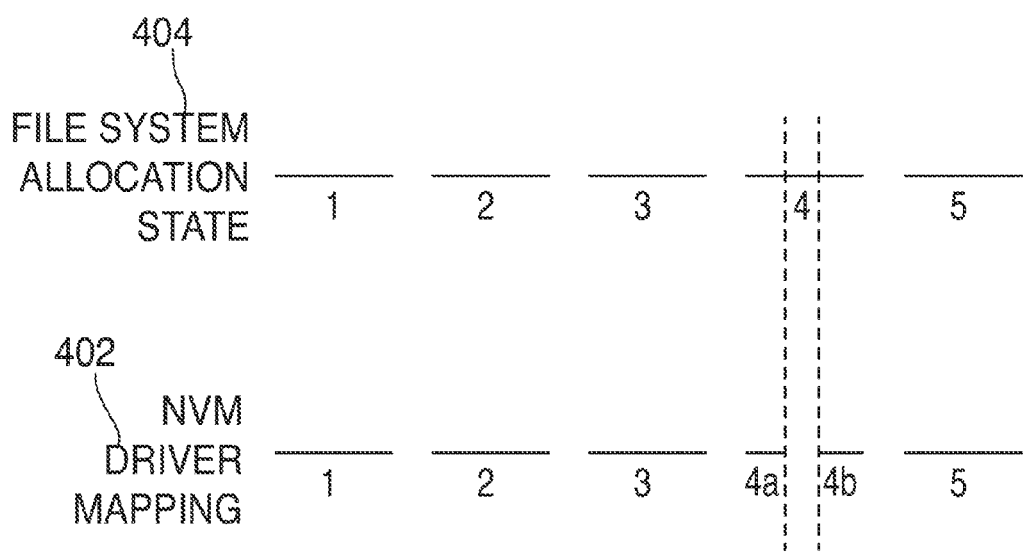
FIG. 4 is a graphical view of illustrative mappings of availability states from the perspectives of a file system and a non-volatile memory driver in accordance with various embodiments of the invention.

An NVM driver mapping can take any suitable form. For example, referring now to FIG. 4, illustrative mappings of availability states are shown from the perspectives of a file system and an NVM driver. In particular, NVM driver mapping 402 can indicate the availability of LBA ranges 1-5 as determined by an NVM interface (e.g., NVM interface 118 of FIG. 1 or NVM interface 218 of FIG. 2). As shown, LBAs that are available (e.g., LBAs that are associated with correctable user data stored in an NVM) are indicated by horizontal lines, whereas LBAs that are unavailable (e.g., LBAs that are unmapped or uncorrectable) are indicated by blank space. Persons skilled in the art will appreciate that NVM driver mapping 402 can provide the availability of any suitable number of LBAs (e.g., all of the LBAs of the system). For the sake of simplicity, only a subset of the NVM driver mapping is shown in FIG. 4.

NVM driver mapping 402 can be stored as any suitable data structure in volatile memory (e.g., memory 114 of FIG. 1) such as, for example, a bitmap, a mapping table, or a range list. In some embodiments, each entry of NVM driver mapping 402 can correspond to a single bit. That is, each entry of the bitmap can store a binary value (e.g., 0 or 1), where each binary value can correspond to an availability state of the associated LBA (e.g., available or unavailable). Alternatively, each entry of the bitmap can correspond to multiple bits, and can thus store additional information regarding an availability state of the associated LBA (e.g., whether a LBA is available, unavailable-unmapped, or unavailable-uncorrectable). Because NVM driver mapping 402 only needs to store the availability of LBAs, and not the actual physical locations of LBAS, NVM driver mapping 402 can occupy a relatively small space in the volatile memory.

Referring back to FIG. 3, at step 306, a file system (e.g., file system 210 of FIG. 2) can be mounted. During the mounting process, a file system allocation state can be generated from a file system journal. The file system allocation state can indicate the file system's view of the availability of LBAs. For example, referring again to FIG. 4, file system allocation state 404 can represent the file system's view of the availability of LBA ranges 1-5. Similar to NVM driver mapping 402, file system allocation state 404 can be stored as any suitable data structure such as, for example, a bitmap, a mapping table, or a range list. In addition, each entry of file system allocation state 404 can correspond to one or more bits.

Continuing to step 308 of FIG. 3, a boot-time unmap can be performed. In particular, the file system can provide a list of currently unmapped LBAs to the NVM driver. Process 300 may then move to step 310.

At step 310, data availability reconciliation can be performed. In particular, a new communication path can be established between the file system and the NVM interface, and the file system allocation state and the NVM driver mapping can be overlaid and compared with one another in order to expose any discrepancies. Because the file system allocation state and the NVM driver mapping are relatively small data structures stored in volatile memory, the comparison process can be relatively fast.

In an ideal scenario, the file system allocation state and the NVM driver mapping should be identical. However, any discrepancies between the file system allocation state and the NVM driver mapping can indicate situations in which the file system assumes that one or more LBAs are available, but the LBAs are actually unavailable in the NVM. Based on these discrepancies, the file system can initiate a recovery process to restore data associated with the one or more unavailable LBAs.

Figure 5:
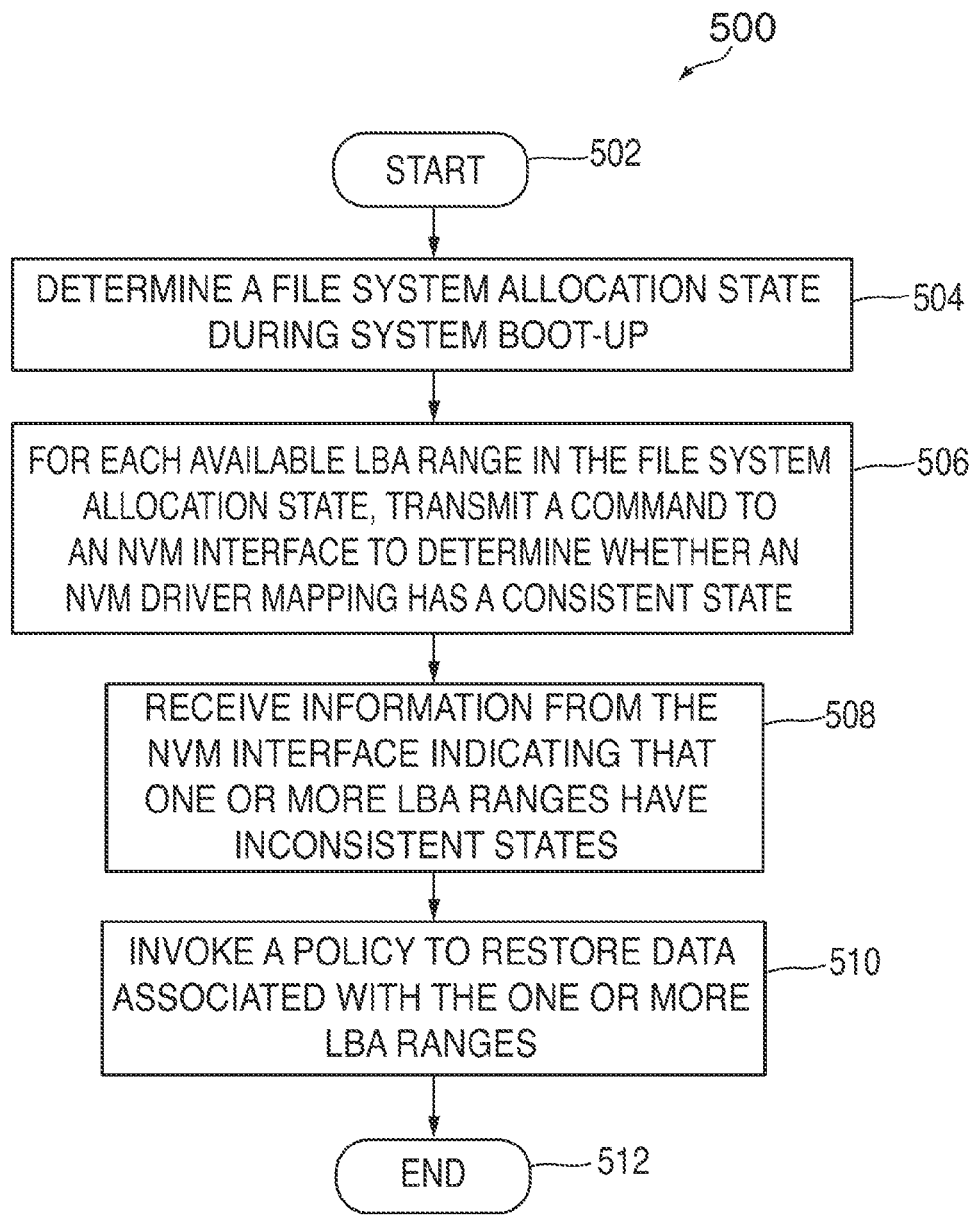
FIG. 5 is a flowchart of an illustrative process for restoring data in accordance with various embodiments of the invention.

Referring now to FIG. 5, an illustrative process 500 for restoring data is shown. Process 500 may begin at step 502, and, at step 504, a file system (e.g., file system 210 of FIG. 2) can determine a file system allocation state (e.g., file system allocation state 404 of FIG. 4) during system boot-up.

Then, at step 506, for each available LBA range in the file system allocation state, the file system can transmit a command to an NVM interface (e.g., NVM interface 118 of FIG. 1 or NVM interface 218 of FIG. 2) to determine whether an NVM driver mapping (e.g., NVM driver mapping 402 of FIG. 4) has a consistent state. In some cases, the command can be in the form of an application programming interface ("API") command. An API can be any suitable interface that allows a software program or module to interact with other software.

Thus, for each LBA range that the file system assumes is allocated in the file system allocation state (e.g., LBA ranges 1-5 of FIG. 4), the file system can transmit an API command. In some embodiments, the API command that is transmitted can have the following format:

$$\text{IsAllValid(LBA,LBA\_end,callback);} \qquad (1),$$

where LBA can correspond to the start LBA of the LBA range, LBA_end can correspond to the end LBA of the LBA range, and callback can correspond to a callback function. The callback function can be a function that enables the NVM interface to communicate with the file system.

In other embodiments, the API command that is transmitted can have the following format:

$$\text{IsAllValid(LBA,LBA\_end,list[ ]);} \qquad (2),$$

where LBA can correspond to the start LBA of the LBA range, LBA_end can correspond to the end LBA of the LBA range, and list[ ] can correspond to a list in which items can be added. Persons skilled in the art will appreciate that the commands transmitted from the file system can have any suitable format. Persons skilled in the art will also appreciate that instead of passing a single LBA range in a command, the file system can pass a list of LBA ranges in a single command.

Continuing to step 508, the file system can receive information from the NVM interface indicating that one or more LBA ranges has inconsistent states. That is, based on a comparison with the NVM driver mapping, the NVM interface may have determined that at least one portion of the one or more LBA ranges is unavailable (e.g., unmapped or uncorrectable).

Then, at step 510, the file system can invoke a policy to restore data (e.g., user data) associated with the one or more LBA ranges. The policy that is invoked for a particular LBA range can be based on a file path associated with the LBA range. For instance, if data associated with the LBA range is temporary data (e.g., the data is deleted and then recreated each time a device is booted-up), the file system can stop restoring the data. On the other hand, if data associated with the LBA range is internal data associated with the file system, the file system can use the internal data to recover the data. As yet another example, if data associated with the LBA range is application-generated data, the file system can invoke a policy associated with the corresponding application to recover the data from an external or back-up source (e.g., issue a restore command to the external source, request an application back-up, or request for a user to plug the device into a computer). Upon restoring the data, the file system can re-mount the data. Process 500 may then end at step 512.

Figure 6:
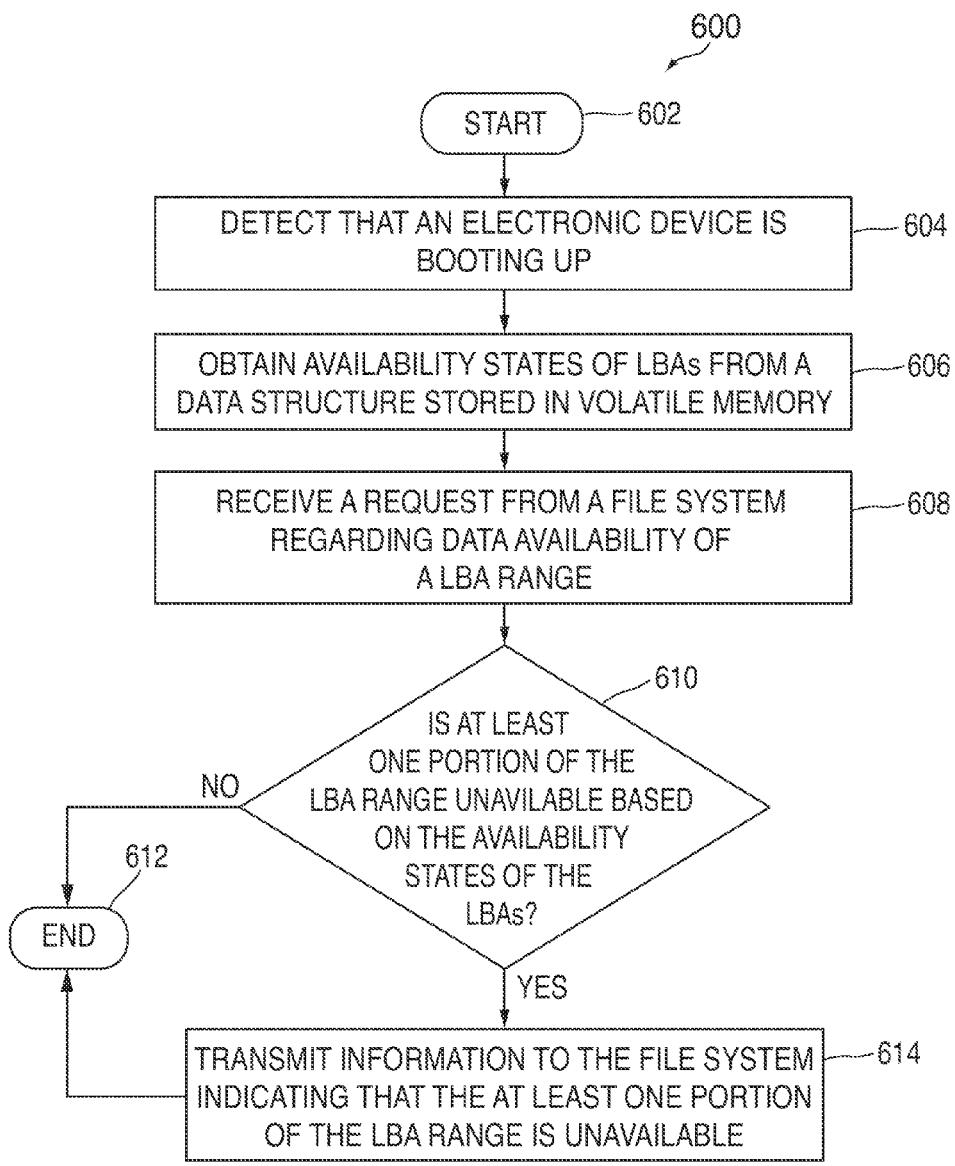
FIG. 6 is a flowchart of an illustrative process for determining data availability in accordance with various embodiments of the invention.

Referring now to FIG. 6, process 600 is shown for determining data availability. Process 600 may begin at step 602, and, at step 604, an NVM interface (e.g., NVM interface 118 of FIG. 1 or NVM interface 218 of FIG. 2) can detect that an electronic device is booting up.

Continuing to step 606, the NVM interface can obtain availability states of LBAs from a data structure (e.g., a tree) stored in volatile memory (e.g., memory 114 of FIG. 1).

Figure 7:
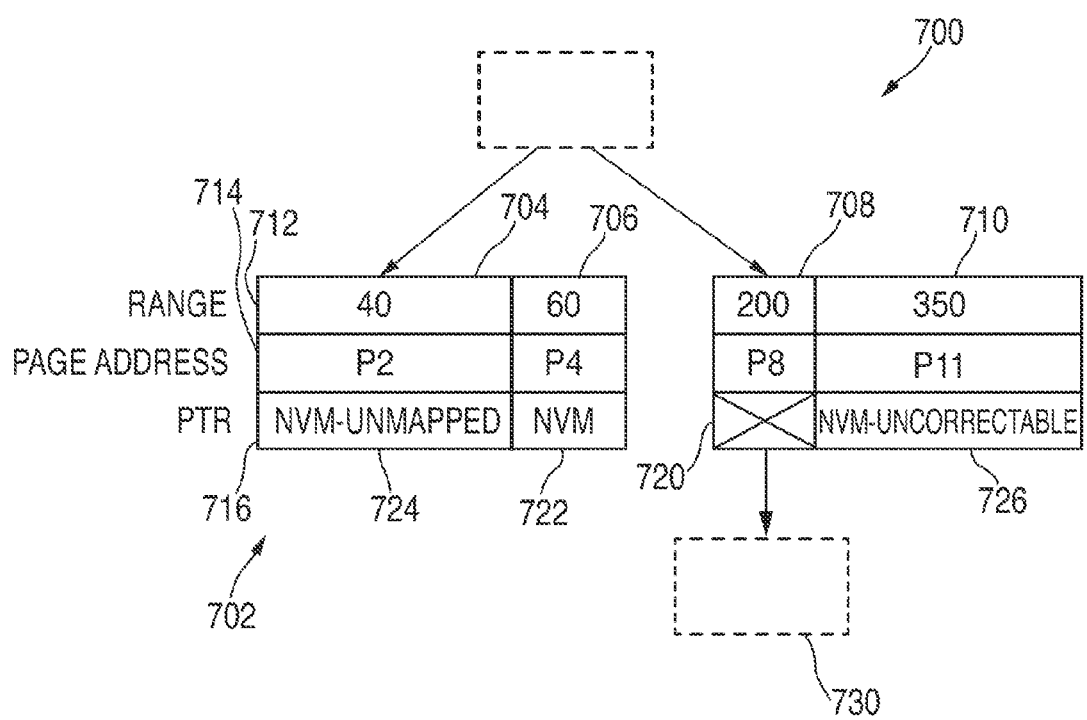
FIG. 7 is a block diagram of an illustrative tree used for providing logical-to-physical mappings in accordance with various embodiments of the invention.

For example, referring now to FIG. 7, tree 700 can be used by the NVM interface to obtain availability states of LBAs. Tree 700 can include multiple nodes, where each node may be consistently sized for memory allocation purposes (e.g., each node may have a fixed size of 64 bytes). For the sake of simplicity, tree 700 is shown to include a small number of nodes. Thus, the dashed boxes in tree 700 can indicate other nodes of tree 700, which are not shown in any detail.

In addition, each node of tree 700 can include one or more entries. For example, as shown in FIG. 7, node 702 can include two entries (e.g., entries 704 and 706). Each entry of a node can be associated with a number of fields. For example, each entry of tree 700 can be associated with LBA range 712 (e.g., a run-length encoding compressed ("rle-compressed") range) and page address 714. In addition, each entry of tree 700 can include a pointer field 716 with a particular token value. Persons skilled in the art will appreciate that each of entries 704-710 of tree 700 can include additional fields not shown in FIG. 7. For the sake of simplicity, however, only three fields are shown for each entry in tree 700.

In some embodiments, each pointer field of an entry can have a value corresponding to a node pointer, an NVM pointer, an NVM-unmapped pointer, or an NVM-uncorrectable pointer. For example, entry 708 of tree 700 is shown to include node pointer 720 (e.g., a pointer to another node 730). As another example, entry 706 is shown to include NVM pointer 722, which can correspond to a physical address of the NVM.

As yet another example, entry 704 can include NVM-unmapped pointer 724, which can be a pointer to the NVM. However, NVM-unmapped pointer 724 can also indicate that associated entry 704 corresponds to unmapped space. As a further example, entry 710 is shown to include NVM-uncorrectable pointer 726, which can also be a pointer to the NVM. NVM-uncorrectable pointer 726 can indicate that associated entry 710 corresponds to uncorrectable space.

In some embodiments, pointers can be updated in tree 700 during a garbage collection ("GC") process. For example, while a translation layer (e.g., translation layer 214 of FIG. 2) is performing GC on a programmed block of the NVM, the translation layer may discover upon reading valid data in the block that the data is uncorrectable. The translation layer can subsequently discard the data, and update the associated pointer in tree 700 to an NVM-uncorrectable pointer.

By maintaining different token values for pointers in tree 700, tree 700 can retain information regarding the allocation states (e.g., mapped/unmapped) and the uncorrectable states of LBAs. As a result, by detecting different token values for the pointers of tree 700, the NVM interface can obtain an NVM driver mapping (e.g., NVM driver mapping 402 of FIG. 4). In particular, LBAs that are associated with NVM pointers can be considered available LBAs, whereas LBAs that are associated with NVM-unmapped pointers and NVM-uncorrectable pointers can be considered unavailable LBAs.

Referring back to FIG. 6, at step 608, the NVM interface can receive a request from a file system (e.g., file system 210 of FIG. 2) regarding data availability of a LBA range. As discussed previously in connection with process 500 (FIG. 5), the request may take the form of an API command.

Then, at step 610, the NVM interface can determine whether at least one portion of the LBA range is unavailable (e.g., unmapped or uncorrectable) based on the availability states of the LBAs (e.g., based on a comparison with an NVM driver mapping such as NVM driver mapping 402 of FIG. 4). If, at step 610, the NVM interface determines that the at least one portion of the LBA range is available, process 600 may end at step 612.

If, at step 610, the NVM interface instead determines that the at least one portion of the LBA range is unavailable, process 600 may move to step 614. For example, responsive to a request from the file system regarding the data availability of LBA range 4 of FIG. 4, the NVM interface may determine that a portion of LBA range 4 in NVM driver mapping 402 is unavailable (e.g., the portion between LBA range 4a and LBA range 4b).

Then, at step 614, the NVM interface can transmit information to the file system indicating that the at least one portion of the LBA range is unavailable. The NVM interface can notify the file system of this unavailability in any suitable manner. In some embodiments, the NVM interface can call a callback function (e.g., the callback function may be provided by the original API command issued by the file system). In some cases, the callback function can be called each time an unavailable portion of a LBA range is detected. Alternatively, the callback function can be called only once regardless of the number of unavailable portions detected in a LBA range.

In other embodiments, the NVM interface can append the at least one LBA range to a list associated with an API command (e.g., the list may be associated with the original API command issued by the file system). The NVM interface can subsequently transmit the list to the file system. In some cases, the NVM interface can transmit the list after all unavailable LBAs have been discovered and appended to the list. Alternatively, the NVM interface can transmit the list as soon as a LBA range has been added to the list.

The NVM interface may transmit general or specific information to the file system regarding LBA unavailability. For example, the NVM interface can provide general information regarding the unavailability of a LBA range. Alternatively, the NVM interface can provide specific information regarding which portion of the LBA range is unavailable. After transmitting the information, process 600 may end at step 612.

Accordingly, by reconciling a file system's view of data availabilities of LBAs with availability states of LBAs obtained from a data structure during system boot-up, the NVM interface is able to communicate any inconsistencies to the file system at an earlier time. This enables the file system to handle the inconsistencies during system boot-up, rather than waiting until the system becomes fully operational.

In some embodiments, instead of using a tree to obtain information regarding the availability of LBAs (e.g., whether a particular LBA is uncorrectable), the NVM interface can obtain an NVM driver mapping by directly scanning the NVM (e.g., by examining the state of one or more flags stored in the NVM). For example, the uncorrectable state of a LBA can be directly maintained in the NVM.

Figure 8:
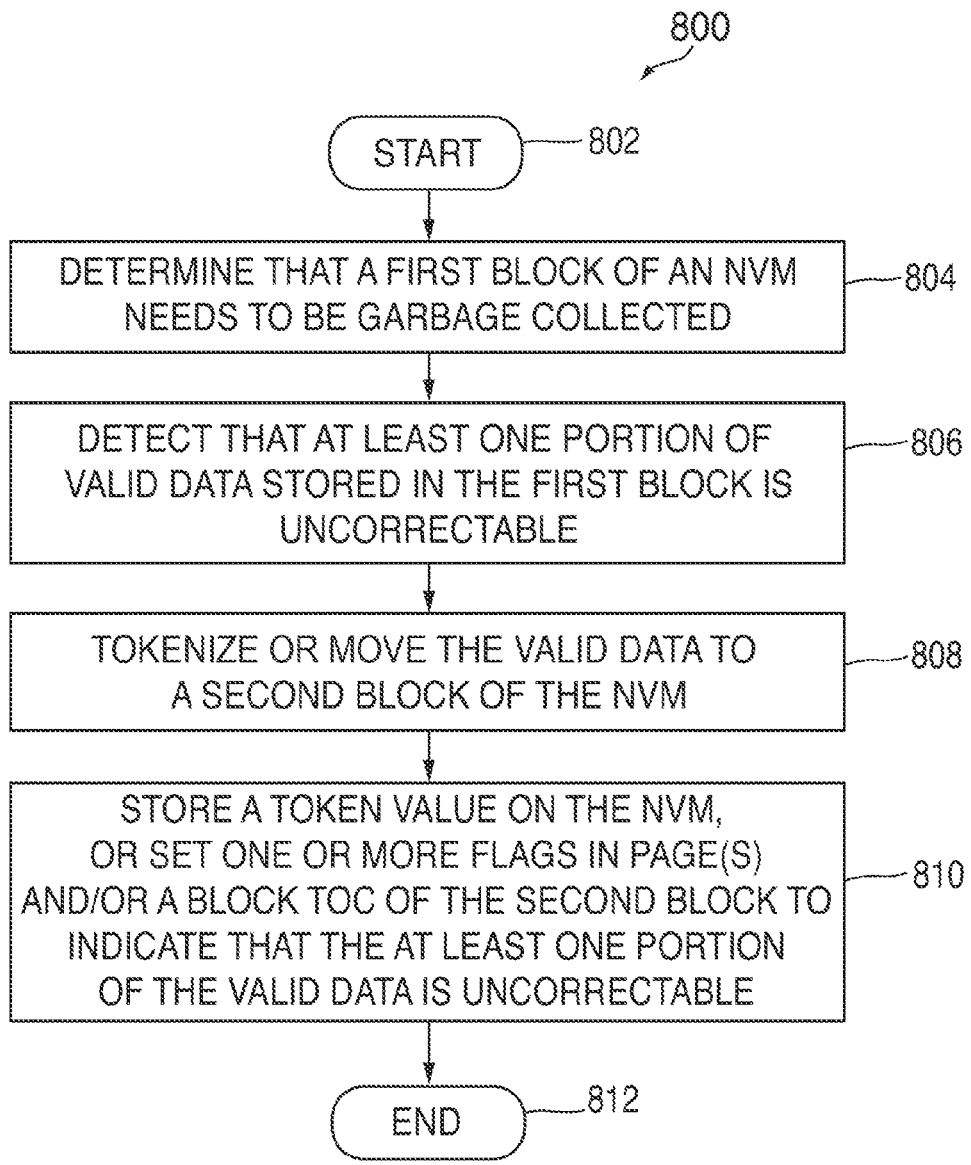
FIG. 8 is a flowchart of an illustrative process for handling uncorrectable data in accordance with various embodiments of the invention.

Turning now to FIG. 8, process 800 is shown for handling uncorrectable data. Process 800 may begin at step 802, and, at step 804, an NVM interface (e.g., NVM interface 118 of FIG. 1 or NVM interface 218 of FIG. 2) can determine that a first block of an NVM (e.g., NVM 120 of FIG. 1 or NVM 220 of FIG. 2) needs to be garbage collected.

Then, at step 806, the NVM interface can detect that at least one portion of valid data stored in the first block is uncorrectable. Process 800 may then move to step 808.

At step 808, the NVM interface can tokenize or move the valid data to a second block of the NVM. For example, in some embodiments, the NVM interface can move the valid data to the second block. In other embodiments, the NVM interface can tokenize the uncorrectable data. That is, the NVM interface can assign the uncorrectable state of the at least one portion of the valid data as a token value in a logical-to-physical mapping system.

Continuing to step 810, the NVM interface can store the token value on the NVM, or set one or more flags in one or more pages and/or a block TOC of the second block to indicate that the at least one portion of the valid data is uncorrectable. Process 800 may then end at step 812.

Thus, by directly maintaining the uncorrectable states of one or more LBAs in the NVM, the NVM interface may not have to update a data structure in volatile memory (e.g., a tree) with this information. When the NVM interface needs to obtain an NVM driver mapping, the NVM interface can scan a block TOC for each block of the NVM. By scanning the block TOCs, the NVM interface can determine the states of the one or more flags, which can indicate whether corresponding data (e.g., user data) stored in the blocks are correctable. This information can be used by the NVM interface to update the NVM driver mapping.

In other embodiments, instead of performing the reconciliation process during system boot-up, the reconciliation process can be performed during run-time, and the reconciliation process can be interspersed with system input/output requests (e.g., read and write commands). That is, after the file system has mounted and boot-time unmap has completed, the system can proceed to run-time without performing data availability reconciliation. In some cases, during run-time, the system can hold off read commands to certain LBA ranges that have not yet been reconciled. Then, upon the occurrence of a particular event (e.g., when the NVM driver first becomes idle, when the NVM driver discovers uncorrectable data, and/or during garbage collection), data availability reconciliation can be performed.

It should be understood that processes 300, 500, 600, and 800 of FIGS. 3, 5, 6, and 8 may be executed by one or more components in a system (e.g., electronic device 100 of FIG. 1 or electronic device 200 of FIG. 2). For example, at least some of the steps in the processes may be performed by a control circuitry (e.g., SoC control circuitry 112 of FIG. 1).

It should also be understood that processes 300, 500, 600, and 800 of FIGS. 3, 5, 6, and 8 are merely illustrative. Any of the steps may be removed, modified, or combined, and any additional steps may be added, without departing from the scope of the invention.

The described embodiments of the invention are presented for the purpose of illustration and not of limitation.

What is claimed is:

1. A method of determining data availability, the method comprising:
    scanning a non-volatile memory ("NVM") during system boot-up to enumerate an NVM driver;
    obtaining an NVM driver mapping based on the enumerated NVM driver;
    mounting a file system;
    receiving a request from the file system regarding data availability of at least one logical block address ("LBA") range;
    determining whether at least one portion of the at least one LBA range is unavailable based on the NVM driver mapping;
    in response to determining that the at least one portion of the at least one LBA range is unavailable, transmitting information to the file system indicating that the at least one portion of the at least one LBA range is unavailable;
    initiating a recovery process during the system boot-up to restore data associated with the at least one portion of the at least one LBA range; and
    transmitting the information to the file system by calling a callback function.

2. The method of claim 1, wherein the NVM driver mapping is at least one of a bitmap, a mapping table, and a range list.

3. The method of claim 1, wherein the scanning further comprises:
    reading context information stored in the NVM, wherein the context information comprises logical-to-physical mappings; and
    loading the logical-to-physical mappings into volatile memory.

4. The method of claim 3, further comprising:
    identifying at least one block with a logical-to-physical mapping that has not been captured by the context information; and
    scanning a block table-of-content ("TOC") of the at least one block to update the logical-to-physical mappings in the volatile memory.

5. The method of claim 4, further comprising obtaining the NVM driver mapping based on the updated logical-to-physical mappings.

6. The method of claim 1, wherein the NVM comprises a plurality of blocks.

7. The method of claim 6, further comprising:
    for each block of the plurality of blocks, scanning a block TOC of the block to determine states of flags, wherein the states of the flags indicate whether corresponding data stored in the block is correctable; and
    updating the NVM driver mapping based on the states of the flags.

8. The method of claim 1, further comprising:
    appending the at least one LBA range to a list; and
    transmitting the list to the file system.

9. A system comprising:
    a non-volatile memory ("NVM");
    a memory interface operative to maintain a NVM driver mapping; and
    a file system operative to:
        determine a file system allocation state during system boot-up;
        for each available logical block address ("LBA") range in the file system allocation state, transmit an application programming interface ("API") command to the memory interface to determine whether the NVM driver mapping has a consistent state;
        receive information from the memory interface indicating that at least one LBA range has an inconsistent state; and
        invoke a policy to restore data associated with the at least one LBA range during the system boot-up, wherein the policy for restoring the data is based on a file path associated with the at least one LBA range.

10. The system of claim 9, wherein the file system is operative to store the file system allocation state as at least one of a bitmap, a mapping table, and a range list.

11. The system of claim 9, wherein the file system is operative to:
  determine that the data associated with the at least one LBA range is temporary data; and
  stop restoring the data.

12. The system of claim 9, wherein the file system is operative to:
  determine that the data associated with the at least one LBA range is internal data associated with the file system;
  use the internal data to recover the data; and
  remount the recovered data.

13. The system of claim 9, wherein the file system is operative to:
  determine that the data associated with the at least one LBA range is application-generated data;
  invoke a policy associated with a particular application to recover the data; and
  remount the recovered data.

14. A memory interface operative to perform data availability reconciliation during device boot-up, the memory interface comprising control circuitry operative to:
  obtain availability states of logical block addresses ("LBAs") from a data structure stored in volatile memory;
  during boot-up of an electronic device, reconcile a file system's view of data availabilities of the LBAs with the availability states of the LBAs obtained from the data structure; and
  communicate inconsistencies between the file system's view and the availability states of the LBAs to the file system, thereby enabling the file system to handle the inconsistencies during the boot-up of the electronic device, wherein the inconsistencies are communicated using a callback function.

15. The memory interface of claim 14, wherein the data structure is a tree stored in the volatile memory.

16. The memory interface of claim 14, wherein the control circuitry is operative to detect whether the tree structure comprises unmapped pointers to the NVM.

17. The memory interface of claim 14, wherein the control circuitry is operative to detect whether the tree structure comprises uncorrectable pointers to the NVM.

18. The memory interface of claim 14, wherein the control circuitry is operative to:
  receive a request from the file system regarding data availability of a logical block address ("LBA") range; and
  determine whether at least one portion of the LBA range is unavailable based on the availability states of the LBAs.

19. The memory interface of claim 18, wherein the control circuitry is operative to:
  determine that the at least one portion of the LBA range is unavailable; and
  transmit information to the file system indicating that the at least one portion of the LBA range is unavailable.

20. The memory interface of claim 18, wherein the control circuitry is operative to determine that the at least one portion of the LBA range is at least one of unmapped and uncorrectable.

* * * * *